US012703148B2

(12) United States Patent
Johnson et al.

(10) Patent No.: US 12,703,148 B2
(45) Date of Patent: Aug. 11, 2026

(54) METHODS AND SYSTEMS FOR FILM TENSIONING IN AN ADDITIVE FABRICATION DEVICE

(71) Applicant: FORMLABS, INC., Somerville, MA (US)

(72) Inventors: Joseph Johnson, Norwood, MA (US); Brian Smith, Arlington, MA (US)

(73) Assignee: Formlabs, Inc., Somerville, MA (US)

( * ) Notice: Subject to any disclaimer, the term of this patent is extended or adjusted under 35 U.S.C. 154(b) by 110 days.

(21) Appl. No.: 18/744,156

(22) Filed: Jun. 14, 2024

(65) Prior Publication Data

US 2025/0042089 A1 Feb. 6, 2025

Related U.S. Application Data

(60) Provisional application No. 63/472,856, filed on Jun. 14, 2023.

(51) Int. Cl.

| | |
|---|---|
| ***B29C 64/255*** | (2017.01) |
| ***B29C 64/124*** | (2017.01) |
| ***B29C 64/30*** | (2017.01) |
| ***B33Y 30/00*** | (2015.01) |

(52) U.S. Cl.

CPC .......... *B29C 64/255* (2017.08); *B29C 64/124* (2017.08); *B29C 64/30* (2017.08); *B33Y 30/00* (2014.12)

(58) Field of Classification Search

CPC ...... B29C 64/255; B29C 64/124; B29C 64/30

See application file for complete search history.

(56) References Cited

U.S. PATENT DOCUMENTS

2020/0269505 A1 * 8/2020 Mansouri ............... B33Y 10/00

FOREIGN PATENT DOCUMENTS

EP 2759879 A1 * 7/2014 ........... G03F 7/0037

* cited by examiner

*Primary Examiner* — JaMel M Nelson

*Assistant Examiner* — Erica Hartsell Funk

(74) *Attorney, Agent, or Firm* — Michael J. Attisha; Greenberg Traurig, LLP

(57) ABSTRACT

A method and system for tensioning film tank in a liquid photopolymer container designed for use in a stereolithography (SLA) additive fabrication device is disclosed. The liquid photopolymer container comprises a tank frame, a film clamp that attaches to the tank frame and secures a film between the clamp and the tank frame, and a film positioned between the clamp and the bottom surface of the tank frame. The film clamp and the tank frame include raised-features and recesses that mate together to increase the grip on the film.

17 Claims, 8 Drawing Sheets

METHODS AND SYSTEMS FOR FILM TENSIONING IN AN ADDITIVE FABRICATION DEVICE

CROSS-REFERENCE TO RELATED APPLICATIONS

The present application claims the benefit under 35 U.S.C. § 119 (e) of U.S. Provisional Patent Application No. 63/472,856, filed Jun. 14, 2023, titled "Methods and Systems for Film Tensioning in an Additive Fabrication Device," which is hereby incorporated by reference in its entirety.

FIELD OF INVENTION

The present invention relates generally to the field of additive manufacturing and, more particularly, to a method and system for tensioning a film of a liquid photopolymer container in a stereolithography additive fabrication device.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable photopolymer, typically first onto a substrate and then one on top of another. Exposure to actinic radiation cures a thin layer of liquid photopolymer, which causes it to harden and adhere to previously cured layers or the bottom surface of the build platform.

The liquid photopolymer tank of an SLA additive fabrication device typically includes a transparent film attached to the tank frame, which acts as a bottom surface for the printing process, such that successive layers are cured in contact with the film and with the build platform or a previously cured layer. This film can be subjected to significant stress during printing, as it must be pulled to prevent the cured resin from sticking to it and to ensure that the printed object adheres to the build plate.

SUMMARY

According to some aspects, a liquid photopolymer container for a stereolithography additive fabrication device is provided, the container comprising a tank frame comprising a surface having a plurality of protrusions, a film clamp configured to interface with the plurality of protrusions on the surface of the tank frame, the film clamp comprising a plurality of holes and/or a plurality of recesses that mate with the plurality of protrusions, and a film arranged between the film clamp and the surface of the tank frame.

According to some aspects, a liquid photopolymer container for a stereolithography additive fabrication device is provided, the container comprising a tank frame comprising a plurality of recesses and/or a plurality of holes, a film clamp configured to interface with the plurality of recesses and/or a plurality of holes of the tank frame, the film clamp comprising a surface having a plurality of protrusions that mate with the plurality of recesses and/or a plurality of holes, and a film arranged between the surface of the film clamp and the tank frame.

According to some aspects, a liquid photopolymer container for a stereolithography additive fabrication device is provided, the container comprising a tank frame comprising a plurality of slots along edges of a surface of the tank frame, a film clamp configured to interface with the plurality of slots of the tank frame, the film clamp comprising a plurality of flanges around edges of the film clamp, wherein the plurality of flanges mate with the plurality of slots of the tank frame, and a film arranged between the film clamp and the surface of the tank frame.

According to some aspects, a liquid photopolymer container for a stereolithography additive fabrication device is provided, the container comprising a tank frame having a bottom surface comprising a plurality of vertical pinches, a film clamp configured to interface with the bottom surface of the tank frame, the film clamp having a plurality of holes adapted to receive the vertical pinches, a film arranged between the film clamp and the bottom surface of the tank frame, wherein the tank frame fills space between the film clamp and the tank frame, thereby providing a secure clamping force on the film.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
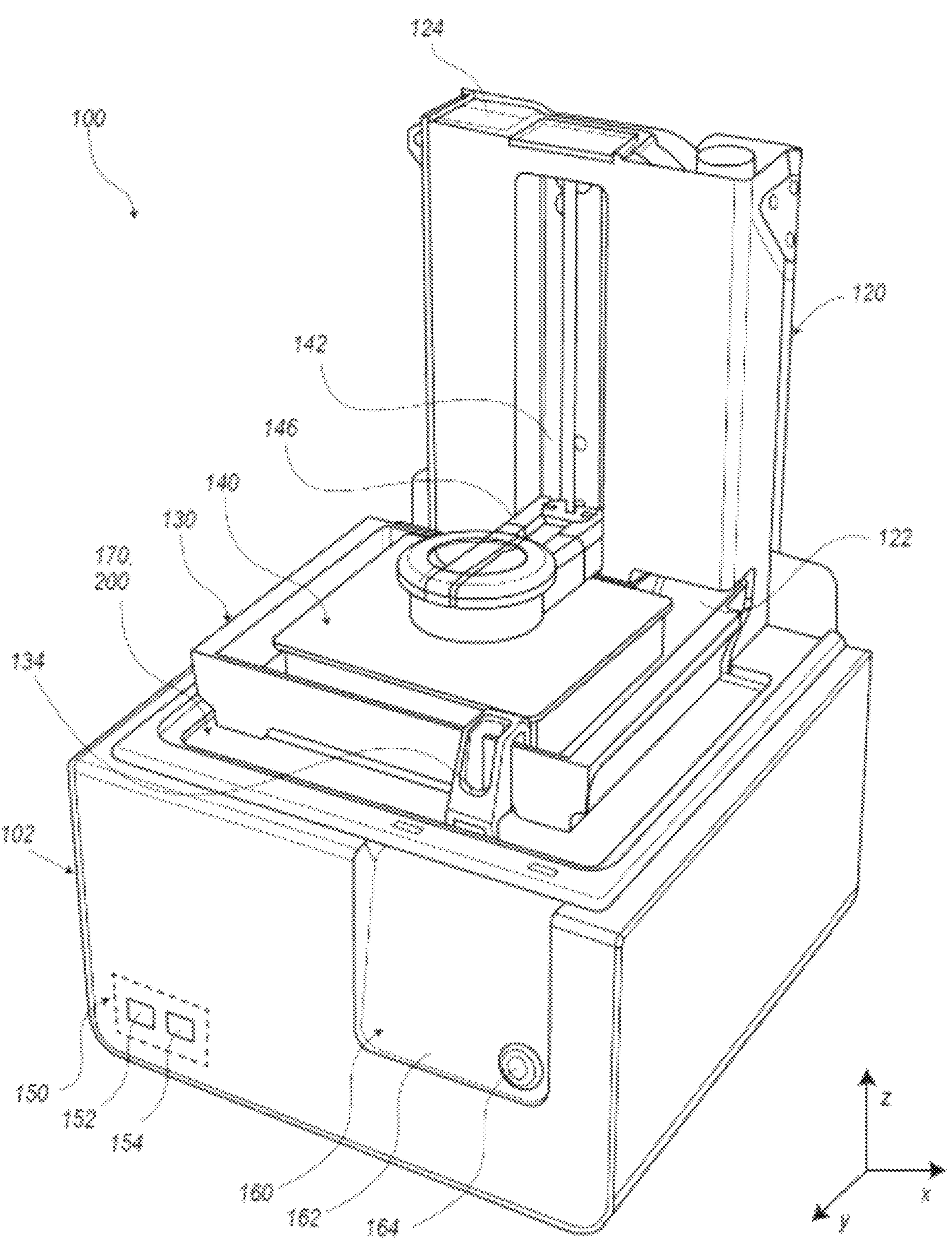
FIG. 1A shows a perspective view of an example additive fabrication system, where the system is arranged in an initial configuration.

As described above, a liquid photopolymer tank of an SLA additive fabrication device typically includes a transparent film attached to the tank frame that acts as at least part of the interior bottom surface of the tank. However, due to stress on the film during fabrication, the film can wear out over time (e.g., deform), which can lead to leaks and other fabrication failures. Conventional methods of attaching the film to the tank frame may not provide sufficient stability or uniform tension throughout the printing process, resulting in inconsistent printing quality.

The inventors have recognized and appreciated improved techniques for tensioning a film of a liquid photopolymer tank for an additive fabrication device. In particular, a liquid photopolymer tank includes a tank frame having a surface with a plurality of protrusions. A film clamp is arranged to interface with the surface of the tank frame and has a set of holes or recesses to mate with the protrusions on the surface of the tank frame. A film that acts as at least part of the interior bottom surface of the tank is clamped between the film clamp and the surface of the tank frame.

In some embodiments, the tank frame comprises several raised features (e.g., raised bumps or posts) that protrude (e.g., stick up), and the film clamp has holes arranged to fit around these features. The raised features are arranged to pass through the film, and the film is stretched over the raised features. The raised features are then melted slightly (e.g., via heat staking), or otherwise deformed, to fasten the tank frame, film, and film clamp together securely. These posts and raised features may be located along the edges of the tank to ensure a tight fit.

In some embodiments, the surfaces of the tank frame or the film clamp are textured. This texture helps to grip the film better, making it less likely to slip when it is under high tension.

In some embodiments, the tank frame and the film clamp are held together using magnets, glue, bolts, screws, clamps, or other fastening methods. This provides an alternative way to secure the film between the tank frame and the film clamp.

Henceforth, a liquid photopolymer container for an additive fabrication device may also be referred to as a "resin container" or a "resin tank." It will be appreciated that an additive fabrication device need not necessarily form parts from a liquid photopolymer resin, and that other liquid photopolymers may be envisioned. As such, references to resin should be understood to be purely for illustrative purposes and not viewed as limiting.

In addition, henceforth an additive fabrication device may also be referred to as a "3D printer" or "SLA 3D printer."." It will be appreciated that such terms are used merely for purposes of explanation and illustration, and should not be viewed as necessary limiting the disclosure to any particular type of additive fabrication device.

In some embodiments, a resin container for use in a stereolithography (SLA) 3D printer is described. This version includes a tank frame with several indentations or holes on its surface. The film clamp has small raised bumps (protrusions) that fit into these indentations or holes. A film is placed between the film clamp and the bottom surface of the tank frame, and the raised bumps and indentations help to hold the film securely in place.

In some embodiments, the tank frame has several small posts (pinches) that stick up, and the film clamp has holes to fit these posts. The posts go through the film, and the film is stretched over the raised bumps. The posts are then melted slightly (heat staking) to fasten the tank frame, film, and film clamp together securely. These posts and raised bumps are located along the edges of the container to ensure a tight fit.

In some embodiments, surfaces of the tank frame and/or the film clamp that contact the film are textured. This texture may help to grip the film better between the tank frame and film clamp, making it less likely that the film slips when it is under high tension.

In some embodiments, the tank frame and the film clamp are held together using magnets, glue, bolts, screws, clamps, and/or other fastening methods. This provides an alternative way to secure the film between the tank frame and the film clamp.

In some embodiments, a resin container for use in a stereolithography (SLA) 3D printer is described. This version includes a tank frame with single or segmented slots along its edges. The film clamp has single or segmented flanges around its edges that fit into these slots. A film is placed between the film clamp and the surface of the tank frame, and the flanges and slots help to hold the film securely in place.

In some embodiments, a resin container for use in a stereolithography (SLA) 3D printer is described. This version includes a tank frame with a bottom surface that has several small posts (pinches) and an initial gap between the bottom surface and the film clamp. The film clamp has holes to fit these posts. A film is placed between the film clamp and the bottom surface of the tank frame. When the film clamp and tank frame are secured together, the tank frame deforms slightly to fill the initial gap, creating a tight clamping force on the film.

Figure 1B:
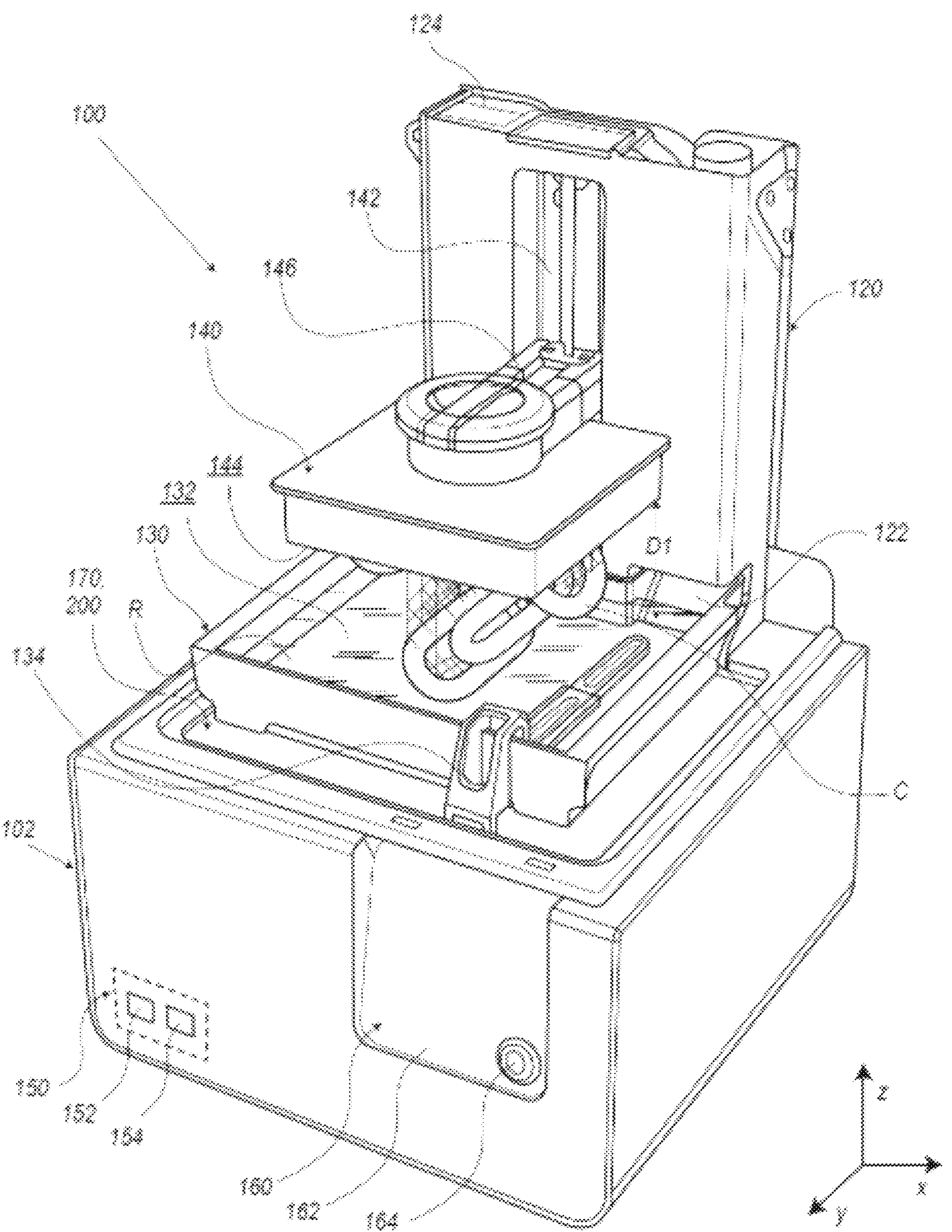
FIG. 1B shows a perspective view of an example additive fabrication system, where the system is arranged in a fabricating configuration.
Figure 1C:
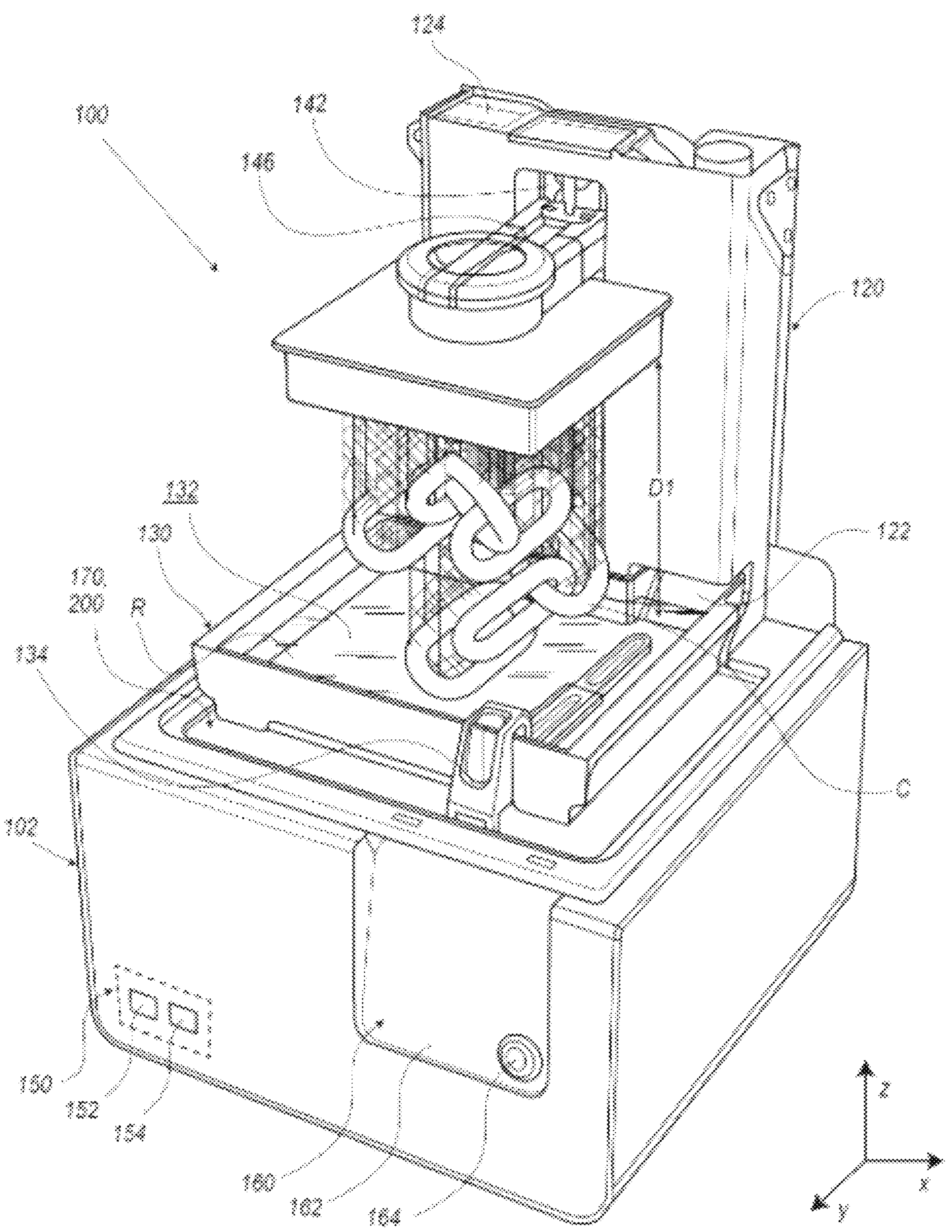
FIG. 1C shows a perspective view of an example additive fabrication system, where the system is arranged in a finished configuration.

Referring to FIGS. 1A-1C, an additive fabrication device 100, such as a stereolithographic printer, includes a base 110 and a dispensing system 120 coupled to the base 110. The base 110 supports a fluid basin 130 configured to receive a photopolymer resin from the dispensing system 120. The printer 100 further includes a build platform 140 positioned above the fluid basin 130 and operable to traverse a vertical axis (e.g., z-axis) between an initial position (FIG. 1A) adjacent to a bottom surface 132 of the fluid basin 130 and a finished position (FIG. 1C) spaced apart from the bottom surface 132 of the fluid basin 130.

The base 110 of the printer 100 may house various mechanical, optical, electrical, and electronic components operable to fabricate objects using the device. In the illustrated example, the base 110 includes a computing system 150 including data processing hardware 152 and memory hardware 154. The data processing hardware 152 is configured to execute instructions stored in the memory hardware 154 to perform computing tasks related to activities (e.g., movement and/or printing based activities) for the printer 100. Generally speaking, the computing system 150 refers to one or more locations of data processing hardware 152 and/or memory hardware 154. For example, the computing system 150 may be located locally on the printer 100 or as part of a remote system (e.g., a remote computer/server or a cloud-based environment).

The base 110 may further include a control panel 160 connected to the computing system 150. The control panel 160 includes a display 162 configured to display operational information associated with the printer 100 and may further include an input device 164, such as a keypad or selection button, for receiving commands from a user. In some examples, the display is a touch-sensitive display providing a graphical user interface configured to receive the user commands from the user in addition to, or in lieu of, the input device 164.

The base 110 houses a curing system 170 configured to transmit actinic radiation into the fluid basin 130 to incrementally cure layers of the photopolymer resin contained within the fluid basin 130. The curing system 170 may include a projector or other radiation source configure to emit light at a wavelength suitable to cure the photopolymer resin within the basin. Thus, different light sources may be selected depending on the desired photopolymer resin to be used for fabricating a component C. In the present disclosure, the curing system 170 includes a liquid crystal panel 200 for curing the photopolymer resin within the fluid basin 130.

As shown, the fluid basin 130 is disposed atop the base 110 adjacent to the curing system 170 and is configured to receive a supply of the resin R from the dispensing system 120. The dispensing system 120 may include an internal reservoir 124 providing an enclosed space for storing the resin until the resin is needed in the fluid basin 130. The dispensing system 120 further includes a dispensing nozzle 122 in communication with the fluid basin 130 to selectively supply the resin R from the internal reservoir 124 to the fluid basin 130.

The build platform 140 may be movable along a vertical track or rail 142 (oriented along the z-axis direction, as shown in FIGS. 1A-1C) such that base-facing build surface 144 of the build platform 140 is positionable at a target distance D1 along the z-axis from the bottom surface 132 of the fluid basin 130. The target distance D1 may be selected based on a desired thickness of a layer of solid material to be produced on the build surface 144 of the build platform 140 or onto a previously formed layer of the object being fabricated. In some implementations, the build platform 140 is removable from the printer 100. For instance, the build platform 140 may be attached to the rail 142 by an arm 146 (e.g., pressure fit or fastened onto) and may be selectively removed from the printer 100 so that a fabricated component C attached to the build surface 144 can be removed via the techniques described above.

In the example of FIGS. 1A-1C, the bottom surface 132 of basin 130 may be transparent to actinic radiation that is generated by the curing system 170 located within the base 110, such that liquid photopolymer resin located between the bottom surface 132 of the basin 130 and the build surface 144 of the build platform 140 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the build surface 144 of the build platform 140 or to a bottom surface of an object being fabricated thereon.

Following the curing of a layer of the fabrication material, the build platform 140 may incrementally advance upward along the rail 142 in order to reposition the build platform 140 for the formation of a new layer and/or to impose separation forces upon any bond with the bottom surface 132 of basin 130. In addition, the basin 130 is mounted onto the support base such that the printer 100 may move the basin 130 along a horizontal axis of motion (e.g., x-axis), the motion thereby advantageously introducing additional separation forces in at least some cases. A wiper 134 is additionally provided, capable of motion along the horizontal axis of motion and which may be removably or otherwise mounted onto the base 110 or the fluid basin 130.

With continued reference to FIGS. 1A-1C, the printer 100 is shown at different stages of the fabrication process. For example, at FIG. 1A, the printer is shown in an initial state prior to dispensing the resin R into the basin 130 from the reservoir 124 of the dispensing system 120. Upon receipt of fabrication instructions, the printer 100 positions the build surface 144 of the build platform 140 at an initial distance D1 from the bottom surface 132 of the basin 130 corresponding to a thickness of the first layer of resin R to be cured. The curing system 170 then emits an actinic radiation profile (i.e., an image) corresponding to the profile of the current layer of the component C to cure the current layer. Upon curing of the current layer, the build platform 140 incrementally advances upward to the next build position. The distance of each advancement increment corresponds to a thickness of the next layer to be fabricated. The curing system 170 then projects the profile of the component layer corresponding to the new position. The new component layer is cured on a bottom surface of the previous component layer. The curing and advancing steps repeat until the build platform 140 reaches the final position (FIG. 1C) corresponding to the finished component C.

Figure 2:
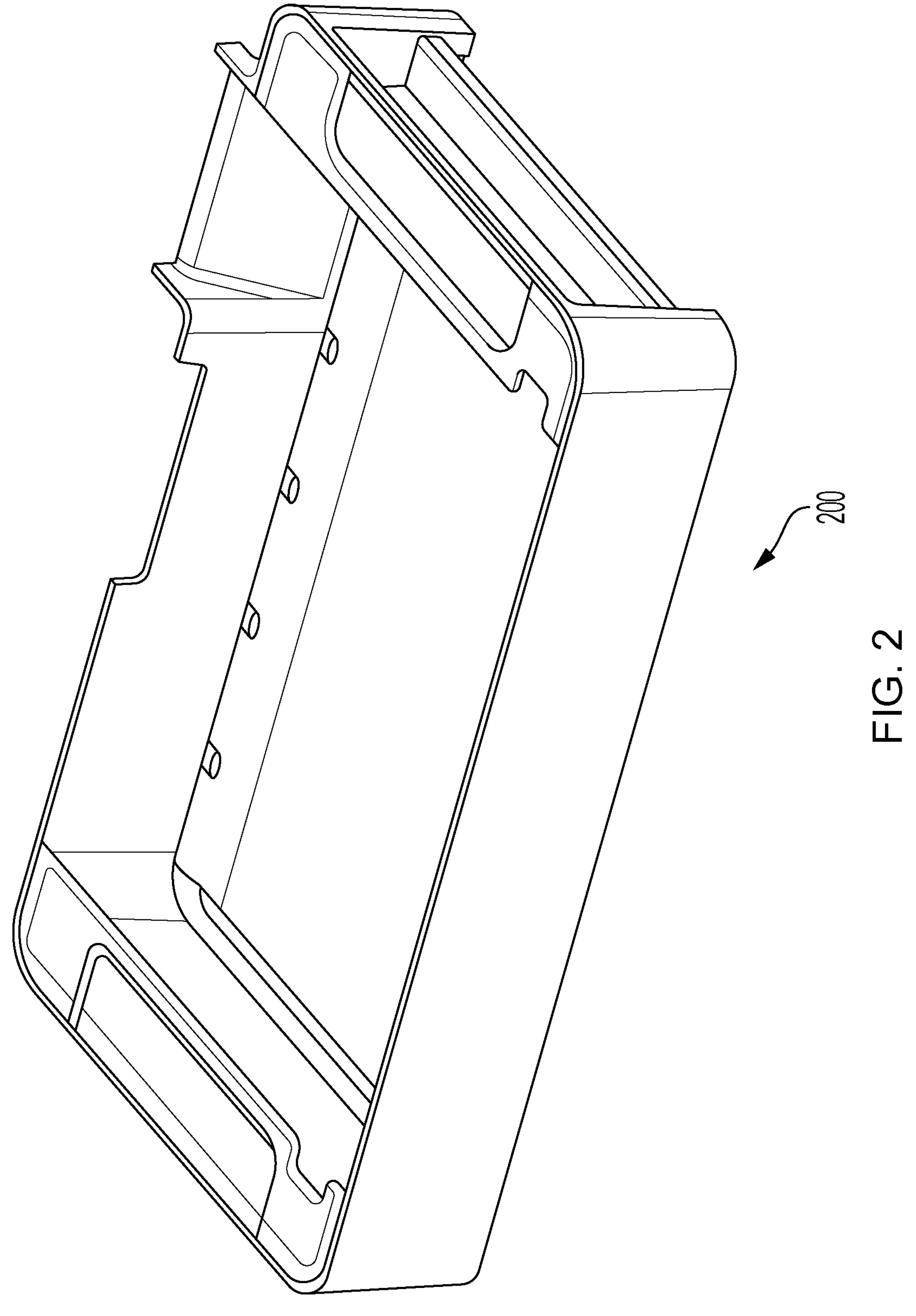
FIG. 2 shows a top perspective view of a resin tank, according to some embodiments.

In FIG. 2, a top perspective view of a resin tank 200 in accordance with some embodiments is depicted. The resin tank 200 is specifically designed for utilization in a stereolithography (SLA) 3D printer, serving the purpose of containing the light-sensitive polymerizable resin and facilitating the curing process of the resin. For instance, the resin tank 200 may be analogous to the basin 130 as illustrated in FIGS. 1A-1C. The primary function of the resin tank is to securely hold the liquid resin, ensuring a consistent and even distribution of the material during the printing process. To further enhance the distribution of the resin, a mixer (not shown in FIG. 2) can be incorporated within the tank, which moves throughout the tank to maintain an even distribution of the resin during printing. Additionally, the resin tank plays a crucial role in maintaining the optimal conditions for the resin to be exposed to the light source, enabling precise and accurate curing of the layers in the 3D printed object.

In some embodiments, the resin tank 200 comprises a tank frame, a film, and a film clamp. The film is tensioned by being securely stretched between the tank frame and the film clamp, ensuring a taut and even surface for the resin to be distributed upon. To achieve this tension, the tank frame and the film clamp are pressed together using one or more fastening mechanisms. These fastening mechanisms may include, but are not limited to, bolts, heat staking, magnets, glue, and/or other suitable methods, or combinations thereof. A secure attachment of the film between the tank frame and the film clamp is crucial for maintaining the integrity of the resin layer and ensuring the optimal performance of the SLA 3D printer during the curing process.

In some embodiments, the tank frame may be made of a rigid material, such as metal or plastic, and is designed to provide structural support for the resin tank. For example, the tank frame may be designed to be opaque to UV or near-UV light.

In some embodiments, the film is a flexible, transparent material that allows UV or near-UV light to pass through it during the SLA printing process (the particular wavelength(s) of light to which the film is transparent may be selected based on the particular photopolymer to be cured). The film may be made of any suitable material stacks. For example, the film may be made of, or may comprise, FEP (fluorinated ethylene propylene), Teflon, and/or any combination of suitable materials stacked on top of each other to create desired properties for the film.

The resin tank 200 can be designed to cater to various usage requirements, including disposable tanks for short-term applications, tanks intended for long-term use, or even film-swappable tanks. Disposable tanks are ideal for situations where a single-use or limited-use application is desired, while long-term use tanks are built with more durable materials to withstand extended periods of use. In the case of film-swappable tanks, the design allows for the film to be easily replaced or swapped when necessary, providing users with the flexibility to maintain optimal printing conditions without the need to replace the entire tank. This feature enables cost-effective maintenance and ensures consistent performance of the SLA 3D printer over time.

The tank frame of the resin tank 200 may incorporate guards on its sides, designed to prevent resin from spilling out during the printing process. This feature is particularly important when a mixer is employed to stir and distribute the resin evenly within the tank. The side guards not only provide additional stability to the tank structure but also ensure that the resin remains contained within the designated area, minimizing the risk of spillage or contamination of the surrounding environment. By incorporating these guards, the resin tank 200 maintains a clean and efficient printing process, contributing to the overall reliability and performance of the SLA 3D printer.

The resin tank 200 can be secured to the printer body using various attachment mechanisms, ensuring a stable and reliable connection during the printing process. These mechanisms may include snap-fits, electromagnets, and/or other suitable methods for firmly attaching the tank to the printer. For instance, slots can be designed to allow the tank to slide into place and lock securely, while electromagnets can provide a strong, adjustable, and easily removable connection between the tank and the printer body. By employing these attachment mechanisms, the resin tank 200 remains firmly in place during the printing process, reducing the risk of misalignment or movement that could affect the quality of the 3D printed object.

Figure 3:
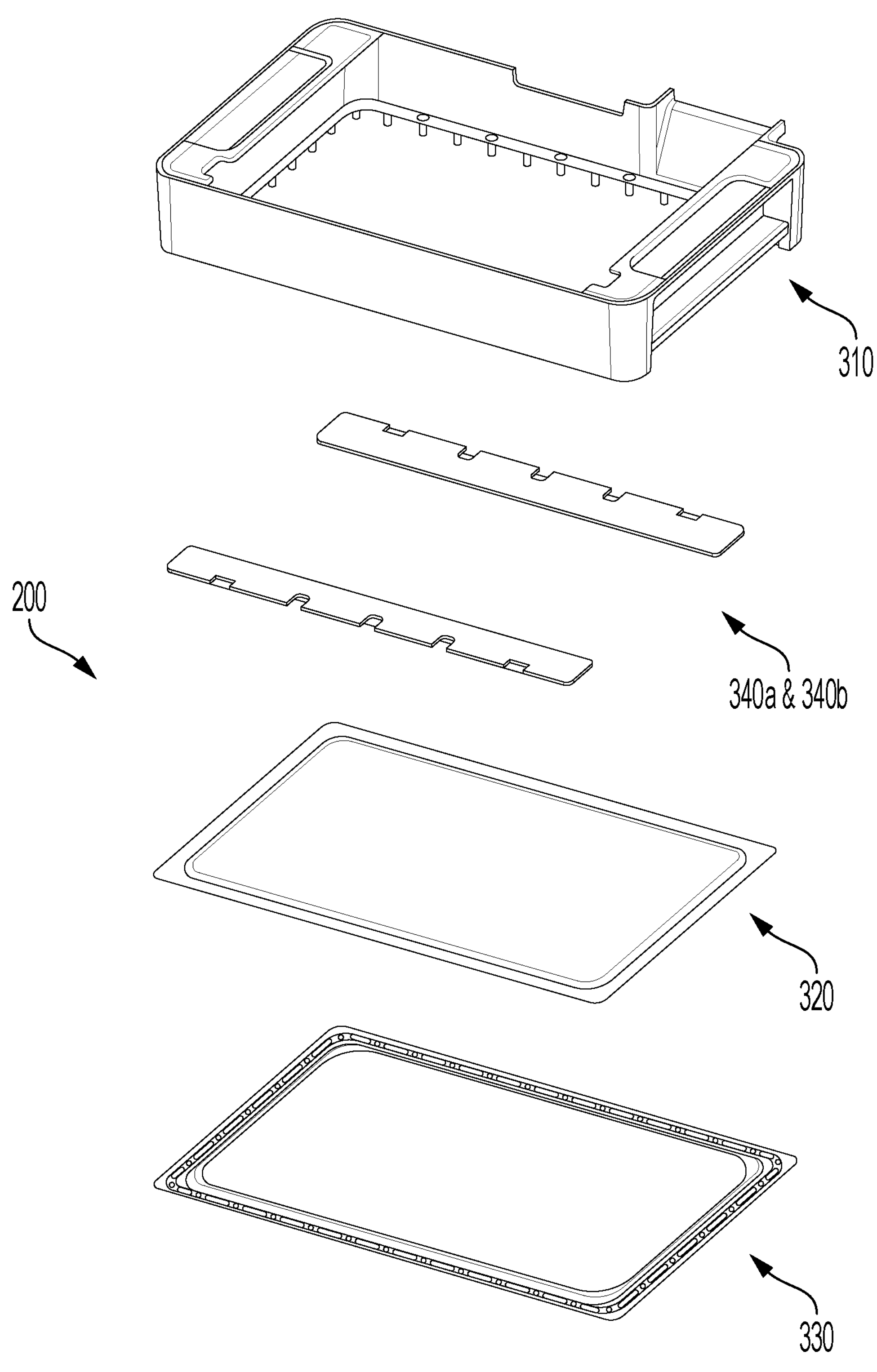
FIG. 3 shows an exploded view of a resin tank assembly, according to some embodiments.

FIG. 3 presents an exploded view of the resin tank 200, in accordance with some embodiments. The resin tank 200 comprises four main components: a tank frame 310, a film 320, a film clamp 330, and optional mixer strips 340*a* and 340*b*. The tank frame 310 is situated above the film 320, which is positioned on top of the film clamp 330. The optional strips 340*a* and 340*b* are placed between the tank frame 310 and the film 320, running along the sides of the tank. As the tank frame 310 is attached to the film clamp 330, the film 320 is secured and tensioned.

The resin tank 200 introduces an innovative film tensioning technique for SLA printers, providing enhanced attachment of the film 320 to the tank frame 310, as well as more uniform tensioning during the printing process. This advanced technique improves the overall quality and reliability of the SLA printing process while also reducing the need for frequent replacement of the film 320 and minimizing associated downtime.

The tank frame 310 and the film clamp 330 are designed to secure the film 320 in the middle. However, if the clamp and the frame merely have flat surfaces to press against the film 320, the film 320 will not be held tightly and the film 320 may, at least in part, slip through the clamped region. To address this issue, recesses or protrusions are incorporated along the edges of the tank frame 310 and film clamp 330. These features serve to deform specific portions of the film, making the film 320 less likely to slip and providing a more secure and stable grip. The various gripping mechanisms will be described in more detail with respect to FIGS. 4-6.

In some embodiments, the tank frame 310 and the film clamp 330 are fastened together using a heat staking technique applied to the plurality of pinches. For instance, the film clamp 330 may include a set of holes 334 configured to receive a plurality of pinches on the tank frame 310, further securing the film 320 between the tank frame 310 and the film clamp 330. The plurality of pinches will undergo heat staking to secure the film 320. Alternatively, the tank frame 310 and the film clamp 330 may be fastened together using other fastening methods, such as magnets, bolts, screws, clamps, and/or other suitable fastening mechanisms.

The optional mixers strips 340*a* and 340*b* serve to shield the film 320 from direct contact with a resin mixer (not shown) that may be utilized during the SLA printing process. By providing a surface for the resin mixer to glide over, the optional strips 340*a* and 340*b* help to extend the life of the film 320 by reducing the risk of damage or wear caused by the resin mixer moving directly on the film 320. The optional strips 340*a* and 340*b* may be made of a rigid or semi-rigid material, and may for instance comprise plastic and/or metal, and are secured between the tank frame 310 and the film 320 during assembly.

In some embodiments, the optional strips 340*a* and 340*b* may be removably attached to the tank frame 310, allowing for easy replacement or adjustment as needed. This can be achieved through various attachment methods, such as snap-fit connections, adhesive, and/or other suitable fastening mechanisms.

FIGS. 4A-4D show example configurations in which the tank frame 310 interfaces with the film clamp 330 with a protrusion-hold configuration. Such configurations increase the contact surface areas between the tank frame 310 and the film clamp 330, and increases the grip on the film 320.

As the film tension increases (which is beneficial to better peeling performance), the film becomes more likely to move between the tank frame and film clamp. When a piece of film is subjected to a flat surface-to-surface contact (flat surface from the film clamp 330 and flat surface from the tank frame 310), slippage can occur due to limited contact area and low interfacial friction. However, this disclosure presents an improved method to address this issue. By modifying the surfaces involved, wherein one surface is equipped with small-scale protrusions and the other surface contains corresponding recesses to accommodate these protrusions, the film's resistance to slippage is significantly enhanced. The introduction of such protrusion-recess configurations amplifies the contact area between the film and the surfaces, thereby augmenting the interfacial friction and effectively mitigating the likelihood of slippage. In addition, the contact surface can be treated to include textures to further enhance the grip on the film. Examples of these grip-enhancing features will be described below.

Figures 4A, 4B, 4C, 4D:
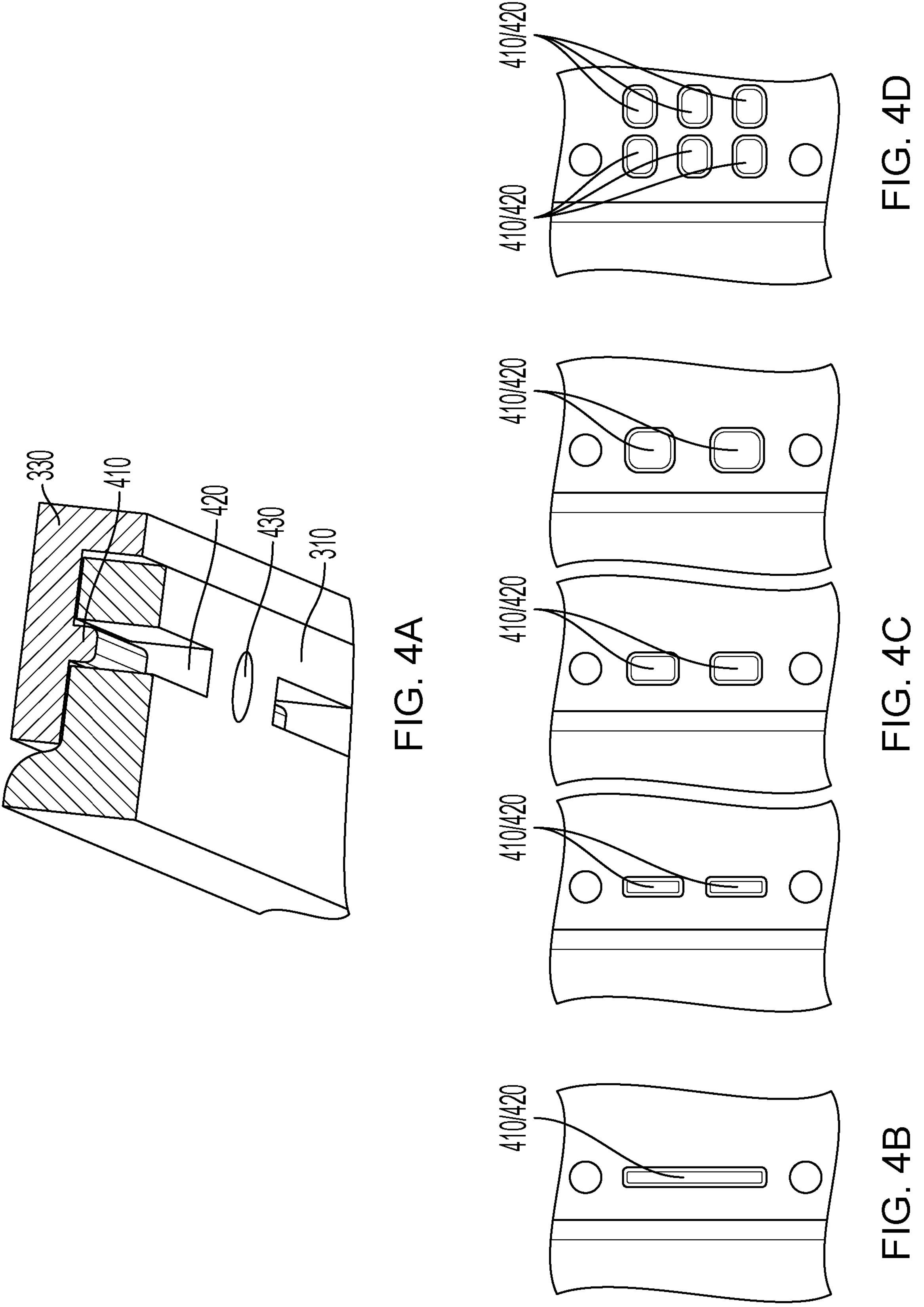
FIGS. 4A-4D show example configurations in which the resin tank frame interfaces with the resin tank clamp with a protrusion-hold configuration.

In FIG. 4A, the tank frame 310 and the film clamp 330 are secured to each other and the film 320 (not shown) is tensioned between the tank frame 310 and the film clamp 330. In some embodiments, the tank frame 310 and clamp 330 can be secured together using one or more fastening methods such as heat staking, glue, magnets, bolts or screws, etc. For example, the film clamp 330 may include holes 430 to accommodate plastic pinches (not shown in FIG. 4A) located on the tank frame 310. The pinches go through the film 320 and the holes 430. The pinches can then be heat staked to securely attach the film clamp 330, the film 320, and the tank frame 310 together. In an alternative embodiment, the film clamp 330 may include plastic pinches and the tank frame 310 may include holes.

In some embodiments, screws or bolts can be used to securely attach the film clamp 330, then film 320, and the tank frame 310 together. For example, bolts or screws can go through the tank frame 310, the film 320, and securely attached to the film clamp 330.

To uniformly stretch the film 320 and maintain it at a high tension, protrusions 410 and recesses/holes 420 engage with each other. The film 320 is pressed between the tank frame 310 and film clamp 330, and portions of the film at the location of the protrusions 410 and recesses/holes 420 are deformed due to the protrusions 410 fitting into the recesses 420, thereby creating additional friction on the film 320 to prevent it from slipping relative to the frame 310 or the clamp 330. This configuration increases the contact surface between the film 320 and the tank frame 310/film clamp 330, as well as the contact surface area between the tank frame 310 and the film clamp 330.

Alternatively, the film clamp 330 may include holes/recesses and the tank frame 310 may include protrusions to fit into the holes/recesses.

The protrusions 410 and the accompanying holes 420 can take various shapes. As shown in FIG. 4B, the protrusions/holes can have an elongated shape stretching between adjacent securing points. Alternatively, as shown in FIG. 4C, multiple protrusions/recesses with different shapes, width, and length can be placed between the adjacent securing points. In another embodiment, as shown in FIG. 4D, multiple columns of protrusions/recesses may be placed between adjacent securing points.

FIGS. 5A-5F describe other grip-enhancing configurations for tensioning the film 320.

Figures 5A, 5B, 5C, 5D, 5E, 5F:
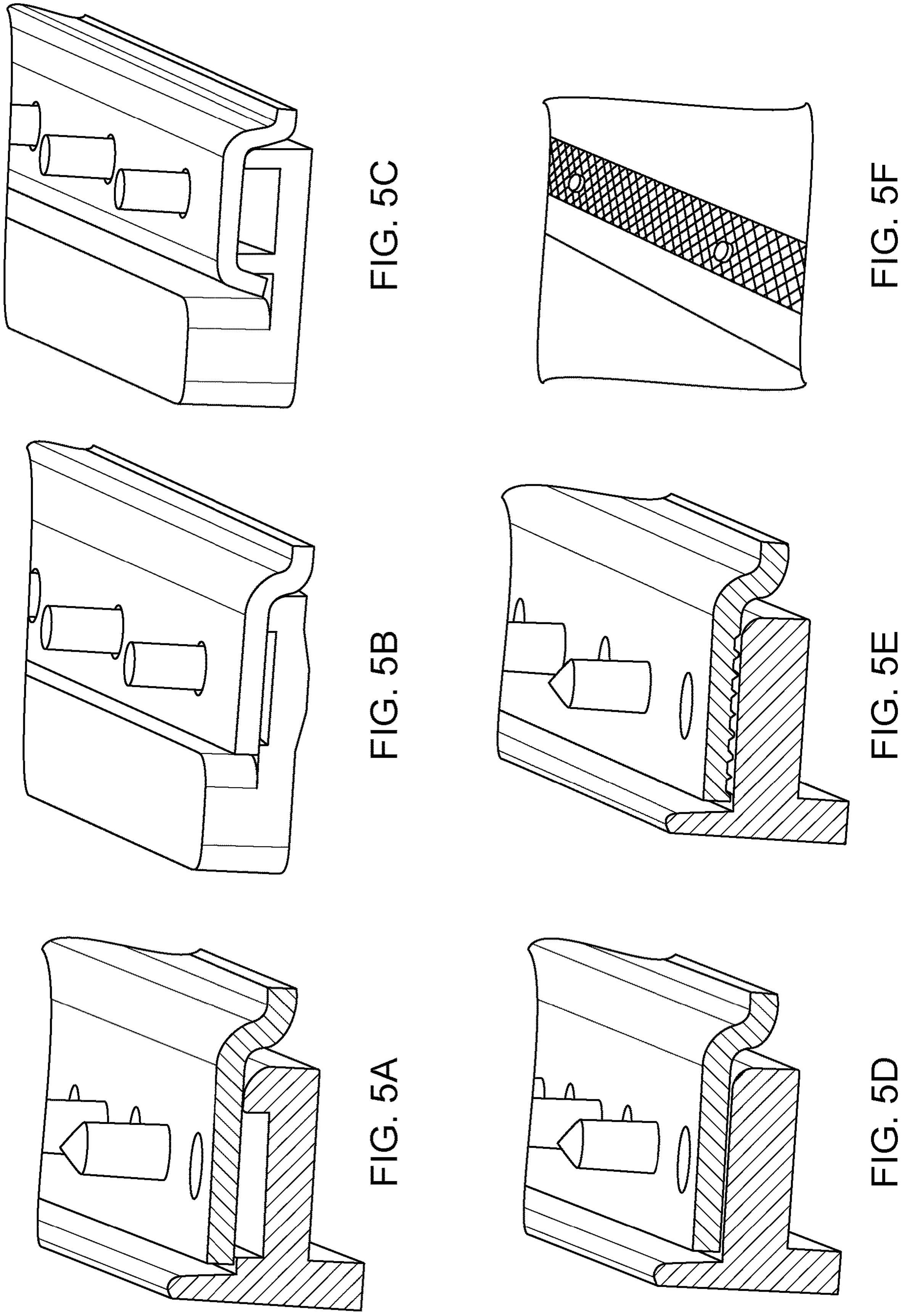
FIGS. 5A-5F show example configurations in which the resin tank frame interfaces with the resin tank clamp.

In FIG. 5A, a gap is left between the film clamp and the tank frame initially. However, as the film clamp is attached to the tank frame (e.g., by tightening bolts between the two or using heat staking), portions of the tank frame corresponding to the gap are pressed against the film, reducing and possibly eliminating the gap between the film clamp and the tank frame.

FIG. 5B shows an alternative embodiment where the portion of the tank frame below the gap has a curved surface rather than a flat surface as shown in FIG. 5A.

FIG. 5C shows an alterative embodiment where an edge of the film clamp is inserted into a slot located on the tank frame, thereby further increasing the friction between the two components.

FIG. 5D shows an embodiment where the film is pressed between two flat surfaces of the film clamp and tank frame. As described earlier, this configuration may lead to the film slipping between the film clamp and tank frame. FIG. 5E shows that the film clamp surface may be texturized to increase grip. Alternatively or additionally, the tank frame surface may also be texturized. FIG. 5F shows an example of textured film clamp.

Figure 6B:
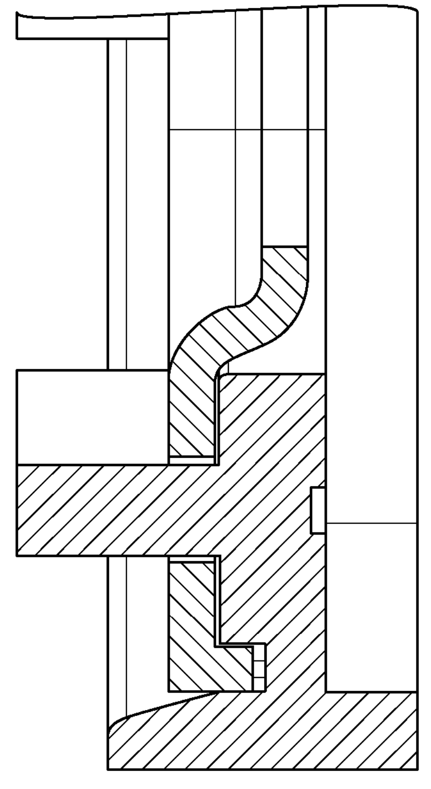
FIGS. 6A-6B show example of grip-enhancing configuration for holding the film at high tension.
Figure 6A:
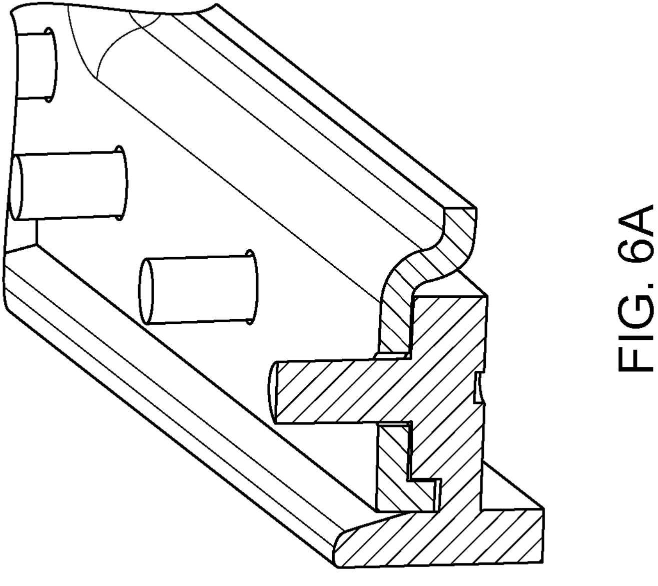

FIGS. 6A-6B show another example of grip-enhancing configuration for holding the film at high tension. The film clamp includes vertical spikes that insert into slots along the edge of the tank frame.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A liquid photopolymer container for a stereolithography additive fabrication device, the container comprising:
- a tank frame comprising a surface having a plurality of protrusions;
- a film clamp interfacing with the plurality of protrusions on the surface of the tank frame, the film clamp comprising a plurality of holes and/or a plurality of recesses in which the plurality of protrusions are arranged; and
- a film arranged between the film clamp and the surface of the tank frame.

2. The liquid photopolymer container of claim 1, wherein the plurality of protrusions include a plurality of pinches, and wherein the film clamp comprises a plurality of holes.

3. The liquid photopolymer container of claim 2, wherein the plurality of pinches are arranged passing through the film, and wherein the film is arranged over at least some of the plurality of protrusions.

4. The liquid photopolymer container of claim 2, wherein the film clamp and the plurality of pinches of the tank frame are fastened to one another via heat staking.

5. The liquid photopolymer container of claim 2, wherein the plurality of protrusions are arranged along edges of the container.

6. The liquid photopolymer container of claim 1, wherein the tank frame and/or the film clamp has a textured surface that contacts the film.

7. The liquid photopolymer container of claim 1, wherein the tank frame and the film clamp are attached to one another via one or more magnets, glue, and/or one or more fasteners.

8. A liquid photopolymer container for a stereolithography additive fabrication device, the container comprising:
- a tank frame comprising a plurality of recesses and/or a plurality of holes;
- a film clamp interfacing with the plurality of recesses and/or a plurality of holes of the tank frame, the film clamp comprising a surface having a plurality of protrusions inserted into the plurality of recesses and/or a plurality of holes; and
- a film arranged between the surface of the film clamp and the tank frame.

9. The liquid photopolymer container of claim 8, wherein the plurality of protrusions include a plurality of pinches, and wherein the tank frame comprises a plurality of holes.

10. The liquid photopolymer container of claim 9, wherein the plurality of pinches are arranged passing through the film, and wherein the film is arranged over at least some of the plurality of protrusions.

11. The liquid photopolymer container of claim 9, wherein the tank frame and the plurality of pinches of the film clamp are fastened to one another via heat staking.

12. The liquid photopolymer container of claim 9, wherein the plurality of protrusions are arranged along edges of the container.

13. The liquid photopolymer container of claim 8, wherein the tank frame and/or the film clamp has a textured surface that contacts the film.

14. The liquid photopolymer container of claim 8, wherein the tank frame and the film clamp are attached to one another via one or more magnets, glue, and/or one or more fasteners.

15. A liquid photopolymer container for a stereolithography additive fabrication device, the container comprising:
- a tank frame comprising a plurality of slots along edges of a surface of the tank frame;
- a film clamp interfacing with the plurality of slots of the tank frame, the film clamp comprising a plurality of flanges around edges of the film clamp, wherein the plurality of flanges are fit within the plurality of slots of the tank frame; and
- a film arranged between the film clamp and the surface of the tank frame.

16. The liquid photopolymer container of claim 15, wherein the plurality of slots comprise one or more segmented slots and wherein the plurality of flanges comprise one or more segmented flanges.

17. A liquid photopolymer container for a stereolithography additive fabrication device, the container comprising:
- a tank frame having a bottom surface comprising a plurality of vertical pinches;
- a film clamp interfacing with the bottom surface of the tank frame, the film clamp having a plurality of holes into which the plurality of vertical pinches are inserted; and
- a film arranged between the film clamp and the bottom surface of the tank frame, wherein the tank frame fills space between the film clamp and the tank frame, thereby providing a secure clamping force on the film.

* * * * *